UNITED STATES PATENT OFFICE.

EDWARD GOODRICH ACHESON, OF STAMFORD TOWNSHIP, WELLAND COUNTY, ONTARIO, CANADA.

DEFLOCCULATED GRAPHITE AND PROCESS OF DEFLOCCULATION THEREOF.

No. 844,989.

Specification of Letters Patent.

Patented Feb. 19, 1907.

Application filed December 10, 1906. Serial No. 347,185.

*To all whom it may concern:*

Be it known that I, EDWARD GOODRICH ACHESON, a citizen of the United States, and residing at Stamford township, Welland county, Province of Ontario, Canada, have invented certain new and useful Improvements in Deflocculated Graphite and Processes of Deflocculation Thereof, of which the following is a specification.

My invention relates to a novel graphite product or article which I have termed "deflocculated graphite" and to the method of producing the same, or to the deflocculation of graphite; and it consists in a new product having the characteristics substantially as hereinafter set forth and the method by which the new product or article is produced.

In the use of unctuous graphite as a lubricator it is well known that the molecules have a tendency to coalesce or flocculate into measurable-sized particles, and in this condition it is not miscible in water or oil and will not remain suspended or float in such vehicles, and for this reason the use of the unctuous graphite as a lubricant under certain conditions is difficult or impossible.

I have discovered that it is practicable to so treat unctuous graphite that it is miscible with water, oil, &c., and will float or remain suspended therein, and the unctuous graphite can thus be readily used as a lubricant in many and various ways, as in the lubrication of steam-engines, when it is mixed or suspended in water, and in connection with bearings or similar parts when mixed or suspended in oil. This may be accomplished by the addition to or the treatment of the unctuous graphite of or with what I term a "modifying or deflocculating agent." Different agents may be employed, and I have discovered that the deflocculation of the graphite can be accomplished by treatment with an agent having the astringent tannic principles contained in nutgalls, tea-leaves, catechu, sumac, hemlock-bark, oak-bark, cutch, and many other barks, leaves, nuts, and woods, all of which contain tannin or are capable of those reactions that are recognized as or considered due to tannin.

The word "tannin" as I herein use it is not confined to gallotannic acid or to any one of the many compounds known to chemistry as "tannic acids," but to the entire class. Watts Dictionary of Chemistry, under the caption of "Tannin" and "Tannic acids," states: "Under the above names are included a large series of compounds occurring in the vegetable kingdom of different constitutions, many of which have been very imperfectly studied." Therefore, while I use the term "modifying or deflocculating agents," I would define them in their application to this descriptive matter as being broader and more general than that above attributed to the word "tannin," and I include any compound derived from vegetable matter containing the active principle necessary for the production of the changes or modifications or transformations herein specified as occurring with relation to the graphite used in the manner set forth. Thus an aqueous infusion of common straw, while not perhaps recognized as tannin or containing tannin, has in this connection proven to be quite as efficient as the similar use of gallotannic acid.

My invention may be carried out in many and various ways, and for purposes of illustration I will describe one specific way by the use of which I have produced satisfactory results. Generally speaking, the graphite is treated to tannin, preferably in the form of gallotannic acid, or with a solution of extract of straw or other equivalent modifying agent as above indicated. I have found that the proportion of tannin used in connection with the graphite may vary, and I have produced satisfactory results by the use of from two to ten per cent. of tannin with respect to the amount of graphite treated. In thus producing the defloceulation of the graphite, tannin, preferably in the form of gallotannic acid, is dissolved in water and the resulting solution is added to the graphite, or the dry tannin may be mixed with the dry graphite and both added to the water. The resulting effect is increased by time. The time, however, can be reduced by the use of a similar solution, which may be added to the graphite to form a soft paste, and by working this paste more or less continuously I have produced equally good effects, if not greater, within two hours' time. By agitating the modifying or deflocculating agent and graphite in any suitable way the time can be reduced and satisfactory results obtained.

The improved product or deflocculated graphite is miscible with water and oil and will remain in suspension or float therein and is thus in a condition to be practically used as a lubricant under the best and most favorable conditions. Thus when mixed and suspended in water it can be fed into the cylinder of a steam-engine as oil is now fed by any of the accepted oiling devices, and especially when used in this way in steam-engines, where high temperatures are carried, the water will be converted into steam and the deflocculated graphite would be deposited and used as a lubricant on the walls of the cylinder. So, too, when the deflocculated graphite is mixed with oil it can be applied to bearings and be thoroughly spread over the working parts and produce the most satisfactory lubrication. Furthermore, if the deflocculated graphite be placed in a crucible and brought to a red heat and afterward mixed with oil it settles quickly, apparently having lost the effect produced by the modifying or deflocculating agent as a result of the red heat. So, too, I have found that when the deflocculated graphite is dried out thoroughly at a temperature of 212° and suspended in oil after a limited time it commences to settle, and the same is true with the graphite thus treated when suspended in water. From this it appears that the deflocculated graphite which remains suspended in water or oil is in a molecular form, and when it is dried out in the manner described it flocculates into measurable-sized particles, and that these particles will settle more or less rapidly and will not remain suspended or floating in the water or oil. When, however, the graphite is deflocculated in the manner above described, there is little or no tendency of its separating and settling; but it remains floating in the water or oil in apparent suspension, being thoroughly miscible therewith. Furthermore, I have found that the untreated unctuous graphite when mixed with water and thrown upon a filter-paper the graphite will not pass through the filter, the filtrate being perfectly clear, whereas deflocculated graphite after suspension in water when thrown on a filter-paper the graphite will pass through the fine filter-paper with the water with apparent ease.

What I claim is—

1. A new product being deflocculated graphite comprising unctuous graphite treated with a deflocculating agent having effects like those due to the effects of tannin thereon, possessing the characteristic of being miscible with water and oil and being suspended therein.

2. A new product being deflocculated graphite comprising unctuous graphite treated with gallotannic acid as a deflocculating agent and having the characteristic of being miscible with and suspended in water, oil and the like.

3. A method of deflocculating graphite, thereby rendering it miscible with water, oil, &c., which consists in treating graphite with a deflocculating agent having effects on the graphite like those due to the effects of tannin on said graphite.

4. A method of deflocculating graphite, thereby rendering it miscible with water, oil, &c., which consists in treating the graphite with a deflocculating agent comprising gallotannic acid.

In testimony whereof I affix my signature in presence of two witnesses.

EDWARD GOODRICH ACHESON.

Witnesses:
WILLIAM ACHESON SMITH,
FLORENCE MYRTLE KYSOR.